(12) United States Patent
Kock et al.

(10) Patent No.: US 12,355,382 B2
(45) Date of Patent: Jul. 8, 2025

(54) MOTOR CONTROL PROCESSING WITH A FLAT PULSE WIDTH MODULATION SCHEME

(71) Applicant: Synapticon GmbH, Schönaich (DE)

(72) Inventors: Florian Kock, Schönaich (DE); Ramin Salehi Arashloo, Schönaich (DE)

(73) Assignee: Synapticon GmbH, Schönaich (DE)

( * ) Notice: Subject to any disclaimer, the term of this patent is extended or adjusted under 35 U.S.C. 154(b) by 129 days.

(21) Appl. No.: 17/924,663

(22) PCT Filed: May 6, 2021

(86) PCT No.: PCT/IB2021/053832
§ 371 (c)(1),
(2) Date: Nov. 10, 2022

(87) PCT Pub. No.: WO2021/229376
PCT Pub. Date: Nov. 18, 2021

(65) Prior Publication Data
US 2023/0188077 A1    Jun. 15, 2023

(30) Foreign Application Priority Data
May 13, 2020    (DE) .......................... 102020112906.8

(51) Int. Cl.
*H02P 27/08*    (2006.01)
*H02P 23/00*    (2016.01)
*H02P 23/14*    (2006.01)

(52) U.S. Cl.
CPC ........ *H02P 27/085* (2013.01); *H02P 23/0027* (2013.01); *H02P 23/14* (2013.01)

(58) Field of Classification Search
CPC .... H02P 27/085; H02P 23/0027; H02P 23/14; H02P 27/08
See application file for complete search history.

(56) References Cited

U.S. PATENT DOCUMENTS

| | | | |
|---|---|---|---|
| 6,605,912 B1* | 8/2003 | Bharadwaj | H02P 21/0089 318/722 |
| 10,742,155 B2* | 8/2020 | Tripathi | H02P 27/085 |
| 10,924,032 B2* | 2/2021 | Burgermeister | H02M 7/5395 |
| 10,944,352 B2* | 3/2021 | Mazda | H02P 21/02 |
| 11,626,827 B2* | 4/2023 | Tripathi | H02P 6/10 318/503 |

(Continued)

FOREIGN PATENT DOCUMENTS

| | | |
|---|---|---|
| DE | 102008009314 A1 | 9/2008 |
| DE | 102008046307 A1 | 4/2009 |

(Continued)

*Primary Examiner* — Thai T Dinh
(74) *Attorney, Agent, or Firm* — Conley Rose, P.C.

(57) ABSTRACT

The invention relates to a motor control processing unit for a motor control device which comprises a voltage source inverter unit, configured to control the voltage source inverter unit to provide a motor voltage following a pulse-width modulation, PWM, scheme, wherein the motor control processing unit is configured to control the voltage source inverter unit according to a flat PWM scheme, which comprises a flat-bottom or flat-top PWM scheme, at least at some times in order to provide a precise motor control with minimized losses. The invention also relates to a corresponding method.

20 Claims, 2 Drawing Sheets

(56) References Cited

U.S. PATENT DOCUMENTS

Figure 1:
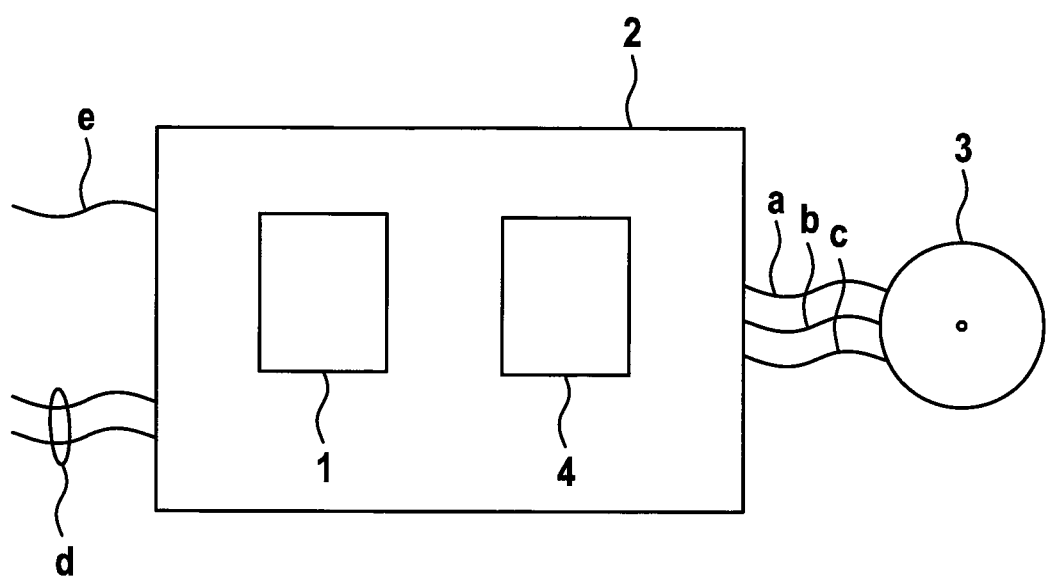

| | | | | |
|---|---|---|---|---|
| 11,695,361 | B2 * | 7/2023 | Carvell | H02P 21/50 |
| | | | | 318/504 |
| 11,888,424 | B1 * | 1/2024 | Carvell | H02P 27/085 |
| 11,916,498 | B2 * | 2/2024 | Younkins | H02P 23/14 |
| 2011/0231040 | A1 | 9/2011 | Schulz et al. | |
| 2012/0139461 | A1 * | 6/2012 | Suzuki | H02P 27/085 |
| | | | | 318/400.03 |
| 2013/0264974 | A1 * | 10/2013 | Suzuki | H02P 27/08 |
| | | | | 318/139 |
| 2015/0280619 | A1 | 10/2015 | Marohl et al. | |
| 2019/0393804 | A1 * | 12/2019 | Burgermeister | H02M 7/5387 |
| 2020/0070832 | A1 * | 3/2020 | Ries-Mueller | B60W 50/0097 |

FOREIGN PATENT DOCUMENTS

| | | | | |
|---|---|---|---|---|
| DE | 102013109224 | A1 * | 2/2015 | H02P 23/0027 |
| DE | 102017124827 | A1 | 5/2018 | |
| DE | 102017124857 | A1 * | 4/2019 | |

* cited by examiner

MOTOR CONTROL PROCESSING WITH A FLAT PULSE WIDTH MODULATION SCHEME

CROSS-REFERENCE TO RELATED APPLICATIONS

This application is a national stage filing of International Application No. PCT/IB2021/053832, filed May 6, 2021, which claims priority to German Application No. 10 2020 112 906.8 filed May 13, 2020. The entire disclosures of the afore-mentioned patent applications are incorporated herein by reference.

The invention relates to a motor control processing unit for a motor control device which comprises a voltage source inverter unit, configured to provide voltages for a motor by using a voltage source inverter unit pulse width modulation, PWM, scheme.

In motor control applications, the motor control processing unit of a motor control device (also referred to as motor drive) computes the desired voltages which should be applied to motor terminals in order to drive the motor with a sinusoidal motor current, for instance. Following a pulse width modulation, PWM, scheme, these voltages are generated at output terminals of a voltage source inverter unit by properly calculating respective duty cycles for each inverter output terminal.

By definition, a duty cycle is the period of time during one PWM period in which the inverter output should be at a "high" state with respect to the entire PWM period. In many cases, the duty cycle is referred to in percentage of PWM period: So, for a voltage source inverter unit switching at 10 kHz, the PWM period is equal to 100 µs, and if the output is switched to "high" for 20 µs, the duty cycle is considered to be 20%. Usually, the switch of the voltage source inverter unit output from "low" to "high" is considered to take place immediately, that is, respective time constants characterizing the rising edge of the duty cycle and the falling edge of the duty cycle are neglected. Hence, real switching components are assumed ideal for the voltage source inverter units. Field effect transistors (FETs), insulated-gate bipolar transistors (IGBTs), or bipolar junction transistors (BJTs) are some examples of these real switching devices.

From a motor's perspective, where the respective windings are isolated from ground GND, what matters is the voltage difference between the motor terminals, for example, "voltage $V_a$–voltage $V_b$" and "voltage $V_b$–voltage $V_c$" for a three-phase motor with three motor terminals a, b, c. In order to drive the desired motor currents through each of the three motor terminals, said differences in electric potential (voltage differences) are applied on the motor terminals. As the absolute potential is irrelevant and can be defined arbitrarily, a voltage component can be added to all motor terminals without, in theory, changing the behavior of the motor. This voltage is commonly referred to as common mode voltage.

In general, there exist three approaches to define absolute potentials for a given course or waveform of voltage in a pulse width modulation scheme.

In the most intuitive way, the duty cycle of each inverter output is proportional to the amplitude of voltage which should be generated by the same inverter output. Carrier-based PWM method is an example of PWM strategies in this category.

An alternative to the previous PWM scheme (in which duty cycles are directly proportional to desired voltages and which is referred to as "normal PWM scheme" in the following) are flat PWM schemes or methods, namely the flat-bottom PWM scheme and the flat-top PWM scheme. These schemes take advantage of the above-described common mode voltage being subtracted or added to all inverter outputs in a way that in all the PWM periods, one inverter output provides the voltage of ground or DC link, and as a result there is no need for switching in this inverter output.

In the flat-bottom PWM scheme, one terminal or leg of the control inverter unit, the terminal that needs to generate the lowest voltage for the present section of the commutation cycle, is constantly pulled down to GND, and the other two terminals are being switched regularly, such that the required potential difference is applied between any two of the terminals of the inverter unit (legs). So, in each commutation cycle, it can be decided which terminal is connected to GND. A commutation cycle may be set to 100 micro-second (in case switching frequency is set to 10 kHz). As an example, for the case of three-phase PM motors with sinusoidal phase current, application of flat-bottom PWM in continuous operation can lead to the situation where one terminal is constantly pulled to ground GND for one third of the electric revolution, then the next terminal is constantly be pulled to ground GND for another third of the electric revolution and finally, the third terminal is constantly pulled to ground GND for the last third of the electric revolution or cycle such that in each of these three phases the required potential difference is applied between any two of the terminals of the inverter unit.

In the flat-top PWM scheme, one terminal or leg of the inverter, the terminal that meets the highest voltage for the present section of the commutation cycle, is constantly pulled to $+V_{DC}$ and the other terminals are being switched regularly, such that the required potential difference is applied between any two of the terminals of the inverter unit.

As another example, for the case of three-phase motors with sinusoidal phase currents, application of flat-top PWM strategy in continuous operation can lead to the situation where one terminal is constantly pulled to $+V_{DC}$ for one third of the electric revolution, then the next terminal is constantly be pulled to $+V_{DC}$ for another third of the electric revolution and finally, the third terminal is constantly pulled to $+V_{DC}$ for the last third of the electric revolution or cycle such that in each of these three phases the required potential difference is applied between any two of the terminals of the inverter unit.

As a result, one of the main advantages of flat PWM schemes is that in each PWM period, in one of the inverter terminals no switching is necessary. This advantage leads to less switching losses in the inverter unit. However, because of the structure of the respective algorithms underlying the flat PWM schemes, the probability of having very low or very high duty cycles in one of the remaining inverter outputs/terminals is increased. This leads to significant disturbances in voltages generated using flat PWM schemes that prevent their use in applications which require high accuracy.

Flat PWM modulation schemes are, however, known to be useful for interconnecting different electrical networks, that is for modular multilevel converter control in high-voltage direct current, HVDC, transmission systems. See for instance US 2017 0 005 589 A1 or the article "Enhanced flat-topped modulation for MMC control in HVDC transmission systems" by Rui Li, John E. Fletcher, Lie Xu, Barry W. Williams et al., published in the IEEE Transactions on Power Delivery, volume 32, issue one, February 2017 on pages 152 to 161.

Consequently, the current ripples and current disturbances resulting from flat PWM lead to flat PWM schemes being used in applications where the duty cycle is limited to a fixed range, such as switching power supplies, but not in applications with high precision such as motor control applications. Normal PWM schemes, on the other hand, minimize current ripples and current disturbances, but the potentials to be reached are almost permanent in between the achievable limits GND and $V_{DC}$, i.e. relatively far away from the achievable limits. To reach such values in between the achievable limits, all inverter legs or terminals must be switched permanently. Each switching event, though, causes losses, degrading the efficiency of the motor control application.

The present invention aims at providing a precise motor control with minimized losses.

This is accomplished by the subject matter of the independent claims.

One aspect of the invention relates to a motor control processing unit, for instance a digital signal processor, DSP, to be used in a motor control device (also referred to as motor control or motor drive). Such a motor control device or motor drive comprises (in addition to the motor control processing unit if present) a voltage source inverter unit, for example a three-phase voltage source inverter unit. The voltage source inverter unit has corresponding terminals that are to be connected to the motor (i.e. to motor terminals) and provide a voltage for the motor, i.e. a motor voltage and consequently a motor current, by using a pulse width modulation, PWM, scheme.

The motor control processing unit is configured to control the voltage source inverter unit according to a flat PWM scheme at least at some times during the operation of the motor control processing unit and/or voltage source inverter unit and/or motor. Said flat PWM scheme may comprise or be a flat-bottom PWM scheme and/or a flat-top PWM scheme and/or any other PWM scheme where one terminal is not switched. Flat PWM schemes may also be referred to as discontinuous PWM schemes. So, the voltage source inverter unit can be controlled according to the flat PWM scheme at some times during operation, but also permanently. At times the flat PWM scheme is not used, a normal PWM scheme may be used. This gives the advantage that the losses are reduced when the flat PWM scheme is used and the precision of the voltage potentials is used when the flat PWM scheme is not used or even when it is used, as described in more detail in the following. In a nutshell, high efficiencies when needed can be combined with a precise or clean torque output when needed.

This is particularly advantageous in low-voltage applications, i.e. for the voltage source inverter unit being a low-voltage (LV) voltage source inverter unit and/or the motor being a low-voltage motor. For instance, voltages lower than 60V or lower than 50V may be considered low-voltage. Reducing the losses in the inverter is particularly reasonable in LV applications because in LV applications, higher currents are needed to reach a given amount of power. As typically a certain amount of power roughly corresponds to certain available amount of space, it is typically needed to "squeeze more current into the same space" in LV environments. Losses in the inverter are mainly proportional to current, so more losses occur in the same, limited space. This leads to thermal problems in many applications, in particular robot or cobot applications, which can be resolved or lessened by a flat (-bottom/-top) PWM.

In a preferred embodiment, the motor control processing unit may be configured to set a duty cycle of the flat PWM scheme and/or normal PWM scheme such that, preferably in each PWM cycle, an integral of the voltage provided by the voltage source inverter unit outputs over time has a linear relation (a constant ratio) with the voltage commanded by the motor control processing unit for that output of inverter unit, in particular for any value of the voltage commanded by the motor control processing unit. In order to achieve this, the nonlinear characteristics of inverter switching devices during turn on and turn off transients is considered during calculation of proper duty cycles for inverter unit.

One advantageous embodiment relates to the motor control processing unit being configured to automatically activate and/or deactivate the flat PWM scheme at runtime, that is, select the PWM scheme at runtime or alternate the PWM scheme at runtime. The PWM scheme may be alternated between a normal scheme and flat PWM scheme, or even between flat-bottom and flat-top PWM scheme. This gives the advantage that the flat PWM scheme, or even the respective flat-bottom or flat-top PWM scheme may be used only in certain (advantageous) regions of the motor map, i.e. at certain (advantageous) operation points of the motor, where distortions or reduction of precision does not matter so much, while efficiency, e.g. due to heat problems caused by the thermal limit of the inverter unit, is very critical. Vice versa a normal PWM scheme, i.e. any PWM scheme commonly used for motors, may be used only in other regions of the motor map, where precision is very important but efficiency is less critical. Usually, the latter applies to low torque/low power regions of the motor map, and the former applies to regions of the high-torque or high-power or when the inverter unit (servo drive) is hot. The activation/deactivation of the flat PWM scheme at runtime enables a dynamic adjustment to the situation at hand, in particular to an operation condition or operation point of the motor control processing unit and/or the motor control device and/or the voltage source inverter unit and/or the motor, as explained in more detail in the following.

Namely, in another advantageous embodiment, the motor control processing unit is configured to activate and/or deactivate the flat PWM scheme in dependence upon at least one parameter representing an operating condition of the motor and/or the motor control device, in particular the voltage source inverter unit. For example, the parameter may be or comprise a measured value, such as a measured velocity of the motor and/or a measured power output of the motor and/or a measured temperature of the voltage source inverter unit and/or motor and/or motor control processing unit, and/or a setpoint, such as a torque setpoint of the motor and/or a velocity setpoint of the motor and/or a power setpoint of the motor. While the velocity setpoint and torque setpoint may be derived by the motor control processing unit itself via the information on motor voltage and motor frequency implicitly comprised in the control signal for the voltage source inverter unit, the measured values may be provided either by respective sensors of the motor control processing unit and/or of the motor control device or by interfaces providing the respective values from other units with such sensors, for instance. This gives the advantage of reduced loss and "good enough" precision in the overall behavior. Also, a fine adjustment becomes possible, that allows to adjust the motor control processing unit more precisely to the motor (control) application at hand.

Namely, the motor control processing unit may be configured to activate or use the flat PWM scheme if the respective parameter representing the operation condition is equal to or greater than one (first) respective preset value, and to deactivate or not use the flat PWM, potentially use a normal PWM, if the respective parameter representing the operating conditions is smaller than the one respective preset value or smaller than another (second) respective preset value, which is different from the one respective value. The preset values may thus be or comprise, i.e. represent, a respective torque limit value and/or velocity limit value and/or temperature limit value. When using two different preset values or threshold, e.g. switching to flat-PWM scheme if accelerating beyond 2000 rpm, but switching back to normal PWM only if decelerating down to 1000 rpm, a hysteresis is effected. Such a hysteresis prevents the motor control processing unit from switching back and forth between the two PWM schemes when operating close to the threshold and oscillating slightly around the threshold. In principle, the PWM scheme that is used by the motor control processing unit may be adjusted to an (arbitrary) number of operating conditions, and thus depend on an (arbitrary) number of parameters and preset values, that may even linked with the standard logic operations AND, OR, NOR, etc: e.g., switch to flat PWM only if velocity (or acceleration) is beyond 2000 rpm AND temperature is more than a given temperature limit; switch to flat PWM only if velocity is beyond 2000 rpm OR temperature is more than a given temperature limit; switch to normal PWM only if neither velocity is beyond 2000 rpm NOR temperature is more than a given temperature limit. So, preset values referring to qualitatively different parameters may be used and even linked with each other.

Also, several (first, second, . . . ) preset values referring to qualitatively identical parameters may be used: for instance, switching to flat-bottom PWM scheme if accelerating beyond 2000 rpm, but switching to an intermediate flat PWM scheme if accelerating to a velocity below 2000 rpm but beyond 1500 rpm, where the intermediate flat PWM scheme follows a flat-bottom PWM scheme to e.g. 40% and a normal PWM scheme to e.g. 60% is possible. This enables a gradual switching between the two extremes of normal PWM and flat-bottom/flat-top PWM schemes and thus allows to adjust the characteristics of the motor control more finely to the application at-hand.

In particular, if the switching, that is, activating and/or deactivating, is based on the torque setpoint, a normal PWM may be chosen if low torque (smaller the preset limit value) is commanded, and flat-bottom or flat-top PWM if high torque (equal to or greater than the preset limit value) is commanded. Namely, at low torque, torque distortions would create a bigger relative error, thus harm more. This is avoided by using a normal PWM scheme. In high torque, the relative efficiency improvement, that is, higher efficiency in percent, of the flat PWM corresponds to the greater reduction in absolute losses. The reduction of losses at high-torque is also more relevant than a low torque, because at high-torque, the likelihood of the controller for reaching its thermal limits is higher.

When the switching is based on the velocity setpoint or a measured velocity, a normal PWM scheme may be chosen if a low velocity (smaller the preset limit value) is commanded and flat PWM if high velocity (equal to or greater than the preset limit value) is commanded. At high velocity, the torque distortion which is caused by flat PWM does not affect the motion much, as they appear at the electrical frequency of the motor, which is high at high velocities and thus filtered out by the inertia and other characteristics of the mechanical system, such as the motor shaft etc. At low velocity, the overall amount of losses in the system is typically lower than at high velocities, as, for instance, friction losses, iron losses in the motor, i.e. losses in the stator core and rotor core, the ferromagnetic section of the motor, grow with velocity. As the overall amount of losses in the system is often limited thermally, because of battery considerations, et cetera, the higher losses of the normal PWM can be accepted easier at low velocities.

As for switching based on power output or power setpoint, it has to be remembered that power equals torque times angular velocity—this approach therefore combines the two aforementioned switching schemes, being of particular advantage in specific settings.

As for switching based on a measured temperature, it has to be noted that any inverter unit has a thermal limit. So, when the accumulated losses over some time excess the capabilities of the cooling system, the inverter unit will either be damaged and result in failure, or shutdown to prevent damage as self protection, or reduce the current towards the motor, which is referred to as the "rating". Each of these consequences has obvious disadvantages in the motor control application. However, switching based on temperature opens another possibility. Namely, the voltage source inverter unit could be operated in a normal PWM mode by default to keep torque distortions and current ripples to a minimum (temperature smaller the preset limit value). When the thermal limit of the voltage source inverter unit is approached (temperature equal to or greater than the preset limit value), it can be switched to a flat PWM mode. Consequently, the losses will be reduced and temperature will decrease while not compromising current output. Instead, the "precision of the current" or "current quality" would be compromised, which can be accepted more easily than failure, shutdown, or derating in almost all applications.

In another advantageous embodiment, the motor control processing unit is configured to activate and/or deactivate the flat PWM scheme with a delay after the respective operating condition is met, i.e. after the corresponding parameter matches the respective predetermined criterion for the respective PWM scheme. Here, the delay can be given by a preset amount of time and/or by another operating condition. So, the actual activation and deactivation of the flat PWM scheme may be postponed to a specific point of time in the future or to a specific operating condition in the future, for instance, an operating condition, where the switch between the different PWM schemes does not cause any problems in the motor application at hand. This gives the advantage of a "buffer", where for instance also undesired frequent and/or subsequent activation and deactivation of the flat PWM scheme is avoided, if the parameter representing an operating condition is changing from greater than said preset value to smaller than said preset value and vice versa in short time, for instance a measured temperature being surpassed only for a very short time and thus in an acceptable manner.

In another exemplary embodiment, the motor control processing unit is configured to set the duty cycle, that is the length/duration of the voltage pulse width corresponding to the PWM period, in dependence upon characteristics of the voltage source inverter unit. This is done in addition to the duty cycle being set in dependence upon a value of the voltage to be achieved by the voltage source inverter unit as known from conventional approaches, where a voltage source inverter unit with ideal switching components (ideal power switches, . . . ) is assumed. So, when setting the duty cycle in the flat PWM scheme, not only the value of the voltage signal to be achieved, for instance a 0.68 times $V_{DC}$, is taken into account, but also said characteristics of the voltage source inverter unit. The characteristics and/or other required information may be provided to or stored in the motor control processing unit, e.g. in a look-up table, or an algorithm may be used by the motor control processing unit to derive required information from the stored data. In particular, said characteristics of the voltage source inverter unit may comprise a first time constant characterizing the rising edge of the duty cycle provided by the voltage source inverter unit and/or a second time constant characterizing the falling edge of the duty cycle provided by the voltage source inverter unit. Preferably, first time constant and second time constant are different from each other. They may depend on the actual voltage source inverter unit used in the application at-hand. This gives the advantage that the precision of the applied voltage to the motor in flat PWM schemes is improved, allowing for reduced losses and voltage distortions while maintaining high precision.

The motor control processing unit may also be configured to set the duty cycle such that, preferably in each PWM cycle, an integral of the voltage provided or generated by the voltage source inverter unit depends linearly on the voltage commanded by the motor control processing unit, in particular for any value of the voltage commanded by the motor control processing unit. Herein, the term "linearly" includes "almost linearly", as a deviation between the integral over ideal voltage and actual voltage, that is, the difference between ideal current and actual current, is minimized here. This minimization, and thus the extent to which said linear dependency can be realized, depends on the quality of the model used for the voltage source inverter unit. Namely, the better the respective first and/or second time constants (or additional parameters) are known for the voltage source inverter unit, the better ideal and actual current can be matched using standard methods of mathematical integration of voltage over time. This gives the advantage of even more precision in the voltage applied to the motor for a flat PWM scheme.

The invention also relates to a motor control device with a voltage source inverter unit and a motor control processing unit according to any of the described embodiments, as well as to a motor device with such a motor control device and/or such a motor control processing unit. Such a motor device may be, for instance an integrated servo motor device, a stepper motor device, or an induction motor device. The motor device may, in particular, be an alternate current (AC) motor device such as a brushless direct current (BLDC) motor device. A motor device with such a motor control device comprising the motor control processing unit and the voltage source inverter unit may be referred to as "integrated motor device". In particular, the invention also relates to a robotic device with such a motor control device or such motor device. This is particularly advantages, as for a robotic device high control accuracy is required along with a high power efficiency, that is, few losses.

Another aspect of the invention relates to a method for controlling a motor control processing unit of a motor control device with a voltage source inverter unit, with the method step of controlling the voltage source inverter unit to provide a motor current following a pulse width modulation, PWM, scheme, and using a flat PWM scheme, which is a flat-bottom PWM's scheme or a flat top PWM scheme, as PWM scheme at least at some times during operation.

Here, advantages and advantageous embodiments of the method correspond to advantages and advantageous embodiments of the motor control processing unit described above.

The features and combinations of features described above, as well as the features and combinations of features disclosed in the figure description or the figures alone may not only be used alone or in the described combination, but also with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combinations of features described by the dependencies of the claims are to be regarded as disclosed.

Exemplary embodiments are further described in the following by means of schematic drawings. Therein, FIG. 1 shows an exemplary embodiment of a motor control processing unit in a motor control device with a motor; and FIG. 2, shows an illustration of exemplary commanded voltage and exemplary voltage generated with an ideal voltage source inverter unit, and exemplary voltage generated with a real voltage source inverter unit.

In FIG. 1, a motor control processing unit 1 is part of a motor control device 2 that is connected to a three-phase motor 3, via respective terminals a, b, and c. The motor control device 2 further comprises a voltage source inverter unit 4 that is configured to provide a motor terminal voltage comprising three motor terminal voltages via the terminals a, b, c following a pulse width modulation, PWM, scheme. The motor control device 2 is connected to a power line d and also features a control terminal e to control the motor control processing unit 1. The motor control processing unit 1 is configured to control the voltage source inverter unit 4 according to normal PWM scheme or flat PWM scheme, in the present case either a flat-bottom PWM scheme or a flat-top PWM scheme, at least at some times of the operation of the motor 3.

Figure 2:
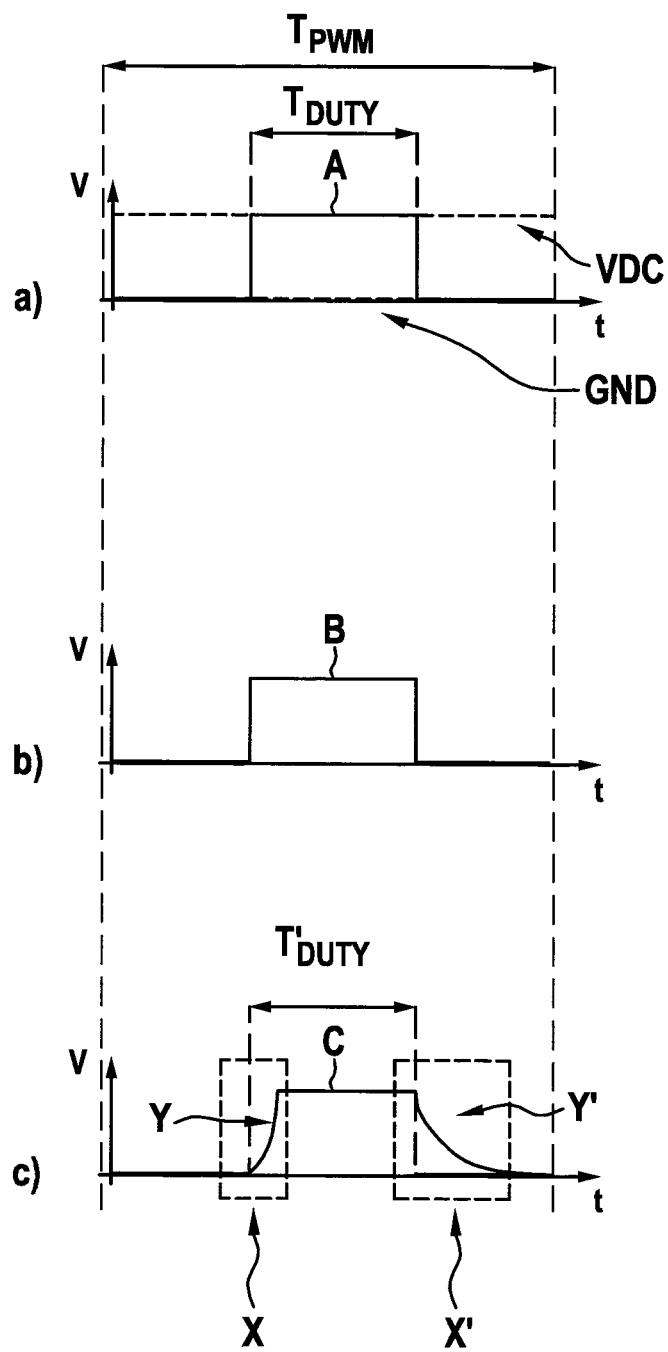

FIG. 2 depicts the exemplary course of the voltage over time during one PWM period at one of the terminals a, b, c of the motor 3.

In the first panel a) of the present example, during the duty cycle characterized by $T_{DUTY}$, the voltage is set to the DC link voltage $V_{DC}$. Apart the duty cycle, the voltage is set to ground GND in the PWM period $T_{PWM}$. The course A of the voltage V over the time t in the first panel a) indicates the commanded voltage at a respective inverter unit output terminal in the known state of the art, which should be achieved in order to arrive at an intended course of the motor current, for example a sinusoidal course, in motor 3.

The second panel b) shows the course B of the voltage V over time t corresponding to the top panel generated with an ideal motor control device, namely a motor control device with an ideal voltage source inverter unit, that is, a voltage source inverter unit with ideal switching components in which the switch turns on an off immediately and with 0 delay. Note that, evidently, the integral of the generated voltage V over time t in panel b) depends linear on the commanded voltage V of panel a).

The third panel c) shows an exemplary voltage generated in a real voltage source inverter unit, that is, a voltage source inverter unit for with real switching components. The course C of the voltage V in the third panel therefore features two areas X, X' where the integral of the generated voltage V over time t is not linearly dependent from the commanded voltage V of panel a). This is due to a finite first time constant characterizing the rising edge Y of course C of the voltage V (at the start of the duty cycle) and a finite second time constant characterizing the falling edge Y' of course C of the voltage V (at the end of the duty cycle). As the time constants are not equal in the shown example, both effects do not cancel out each other, resulting in a deviation between actual motor current and commanded motor current. So, said non-linearity leads to higher motor current ripples and motor current disturbances.

These effects are minimized by adjusting the effective duty cycle T'DUTY based on the respective first and second time constants such that the integral over time over one PWM period in panel c) matches the integral of the duty cycle the duty of the commanded voltage shown in panel a). So, the commanded voltages as known from the state of the art are used as a basis for the computation of the required or effective duty cycles for the inverter units' switching components in a way that the integral of the real generated voltage is linear with the commanded voltage.

The invention claimed is:

1. A motor control processing unit for a motor control device having a low-voltage source inverter unit, the motor control processing unit configured to control the low-voltage source inverter unit to provide a low voltage to a low-voltage motor by using a pulse-width modulation (PWM) scheme, characterized in that:
    the motor control processing unit is configured to control the low-voltage source inverter unit according to a flat PWM scheme, which comprises a flat-bottom or flat-top PWM scheme, at least at some times; and
    the motor control processing unit is configured to activate and/or deactivate the flat PWM scheme in dependence upon a parameter representing an operating condition, the parameter including one or more of a measured temperature, a torque setpoint or a power setpoint.

2. The motor control processing unit according to claim 1, characterized in that:
    the motor control processing unit is configured to automatically activate and/or deactivate the flat PWM scheme at runtime.

3. The motor control processing unit according to claim 1, characterized in that:
    the motor control processing unit is configured to activate and/or deactivate the flat PWM scheme with a delay given by a preset amount of time.

4. The motor control processing unit according to claim 1, characterized in that:
    the motor control processing unit is configured to activate the flat PWM scheme if the parameter representing the operating condition is equal to or greater than a preset value, and to deactivate the flat PWM if the parameter representing the operating condition is smaller than the preset value.

5. The motor control processing unit according to claim 1, characterized in that:
    the motor control processing unit is configured to activate and/or deactivate the flat PWM scheme with a delay, where the delay can be given by another operating condition.

6. The motor control processing unit according to claim 1, characterized in that:
    the motor control processing unit is configured to set a duty cycle provided by the voltage source inverter unit in dependence upon a first time constant characterizing a rising edge of the duty cycle and/or a second time constant characterizing a falling edge of the duty cycle.

7. The motor control processing unit according to claim 6, characterized in that:
    the motor control processing unit is configured to set the duty cycle such that, in each PWM cycle, an integral of the voltage provided by the voltage source inverter unit over time depends linearly on the voltage commanded by the motor control processing unit for any value of the voltage commanded by the motor control processing unit.

8. The motor control processing unit according to claim 1, wherein the operating parameter comprises a measured velocity.

9. The motor control processing unit according to claim 1, wherein the setpoint comprises a velocity setpoint.

10. The motor control processing unit according to claim 1, wherein the parameter is a measured temperature.

11. The motor control processing unit according to claim 1, wherein the parameter is a torque setpoint.

12. The motor control processing unit according to claim 1, wherein the parameter is a power setpoint.

13. A motor control device, comprising:
    a low-voltage source inverter unit; and
    a motor control processing unit,
    wherein the motor control processing unit is configured to control the low-voltage source inverter unit to provide a low voltage to a low-voltage motor by using a pulse-width modulation (PWM) scheme, characterized in that:
    the motor control processing unit is configured to control the low-voltage source inverter unit according to a flat PWM scheme, which comprises a flat-bottom or flat-top PWM scheme, at least at some times; and
    the motor control processing unit is configured to activate and/or deactivate the flat PWM scheme in dependence upon a parameter representing an operating condition, the parameter including one or more of a measured temperature, a torque setpoint or a power setpoint.

14. A robotic device with the motor control device of claim 13.

15. A low-voltage motor device with the motor control device of claim 13.

16. A robotic device with the low-voltage motor device of claim 15.

17. A method for controlling a motor control processing unit of a motor control device with a low-voltage source inverter unit, comprising:
    controlling the low-voltage source inverter unit to provide a low voltage to a low-voltage motor following a pulse-width modulation (PWM) scheme, using a flat PWM scheme, which is a flat-bottom PWM or a flat-top PWM scheme, as the PWM scheme at least at some times; and
    activating and/or deactivating the flat PWM scheme in dependence upon a parameter representing an operating condition, the parameter including one or more of a measured temperature, a torque setpoint or a power setpoint.

18. The method according to claim 17, wherein the parameter is a measured temperature.

19. The method according to claim 17, wherein the parameter is a torque setpoint.

20. The method according to claim 17, wherein the parameter is a power setpoint.

* * * * *